Feb. 9, 1954 H. C. SCHUTT Re. 23,781

SPRAYING DEVICE

Original Filed Aug. 20, 1949

INVENTOR
HERMANN C. SCHUTT

BY Morgan, Finnegan & Durham
ATTORNEYS.

Reissued Feb. 9, 1954

Re. 23,781

UNITED STATES PATENT OFFICE 23,781

SPRAYING DEVICE

Hermann C. Schutt, Framingham, Mass., assignor to Stone & Webster Engineering Corporation, Boston, Mass., a corporation of Massachusetts Original No. 2,602,002, dated July 1, 1952, Serial No. 111,515, August 20, 1949. Application for reissue July 1, 1953, Serial No. 365,573

13 Claims. (Cl. 299—63)

Matter enclosed in heavy brackets [ ] appears in the original patent but forms no part of this reissue specification; matter printed in italics indicates the additions made by reissue.

This invention relates to spraying devices and relates more particularly to centrifugal spraying devices of utility especially for operating on a fluid mixture or solution of solid and liquid to atomize the same into a finely divided state in which evaporation of the solvent or the liquid from the particles so formed may proceed in a more rapid and efficient manner for recovery of the dry solid in a discrete particle form.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

An object of this invention is to enable the attainment and the maintenance of a state of homogeneity in the fluid arriving at the spray head through the provision of a novel and improved system of moving and fixed vanes in the spray device in order that the particles formed by discharge therefrom into a drying space may be of the same uniform size and consistency so as to possess the same rate of [all] *fall* through the drying space and thereby achieve uniform drying.

Another object of this invention is to enable a more thorough and effective atomization and/or dispersion of such a fluid into a drying medium in a drying tower and a more rapid, efficient and uniform drying of the particles therein through the provision of a novel and improved system of stationary diffusion ports or nozzles in the spraying device operative to impart to the particles on discharge, motion in a circular direction around the spray head of the device, which motion is advantageously counter to that of the contacting drying medium.

Another object of this invention is to enable the direction of discharge of fluid from the spray head to be controlled from a distance so as to permit the fluid to be discharged at will over a wide range of angles, through the provision of a novel and improved positionally adjustable valving rotor in accordance with this invention.

Another object of this invention is to aid the dispersion effect of the nozzles, prevent clogging of the nozzles, and permit of adjustment of spray distance or radius, through the provision in the spray head of a novel and improved valving rotor unit variable as to speed and therefore as to frequency of interruption of discharge through the stationary diffusion nozzles.

Another object of this invention is to impart to the fluid, merely by varying motor speed, an increasing pressure commensurate with the increased frequency of discharge interruption through the spray head while maintaining a substantially constant rate of discharge without varying the external pressure, through the provision of the moving vanes, acting as pumping element, of this invention.

Figure 1:
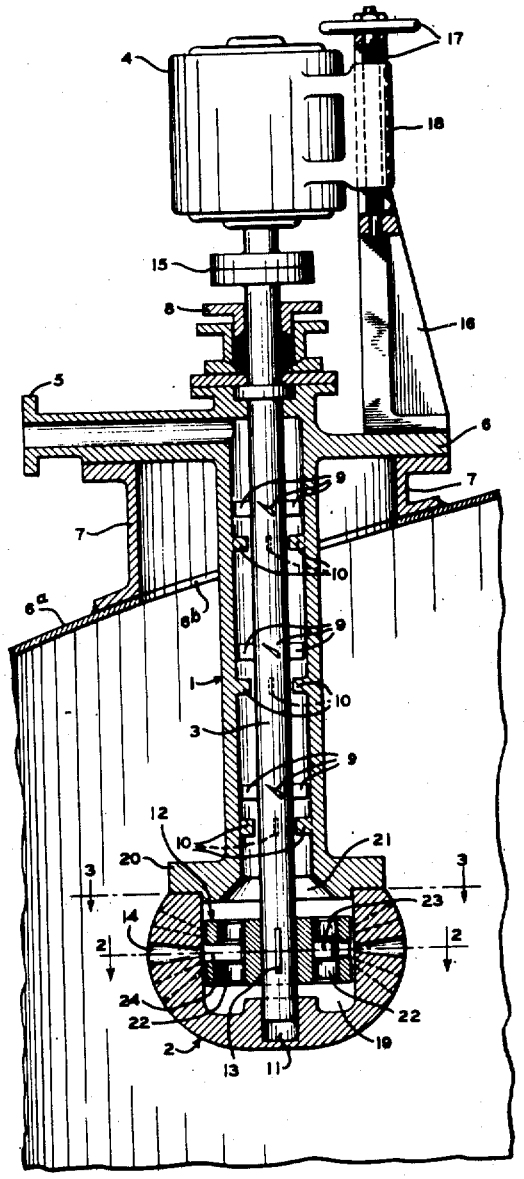
Fig. 1 is a view in vertical section with parts in elevation of a typical and illustrative embodiment of the spray device in accordance with this invention showing the device installed in the top of a [driving] *drying* tower, the section plane corresponding to the line 1—1 of Fig. 2.

In accordance with the illustrative embodiment of this invention, an upright stationary rotor shaft housing 1, preferably tubular, is detachably bolted or otherwise sealingly connected at its lower end, as viewed in Fig. 1, to a stationary, generally hollow spray head 2. The housing 1 encases a rotor shaft 3, coaxial therewith, whose lower end is provided with a cylindrical valving rotor 12 detachably connected thereto and encased by the spray head. The shaft 13 is detachably connected at its other end to a prime mover 4. Fluid material to be sprayed is adapted to be supplied to the interior of the housing 1 adjacent the top thereof for which purpose the housing 1 as here embodied is provided with a suitable inlet nozzle 5. The nozzle 5 advantageously is formed integrally with an annular flange 6 also preferably integral and concentric with the housing 1, which serves as a belting flange by which the device may be supported in an upright position, as shown in Fig. 1, with the spray head 2 disposed in the interior of a drying tower 6a into which the atomized fluid is to be discharged from the spray head and descend in contact with a suitable drying medium and be dried. The tower 6a is suitably apertured at its top, as at 6b, for the introduction of the spray device and is provided, preferably, with an annular bolting flange 7 circumferentially of the opening, sealingly engaged by the bolting flange 6.

A gland 8 at the top of the housing seals the housing against leakage of fluid around the shaft 3 and provides a [thrust] bearing for the shaft. Sets of impellers or vanes 9 are attached to the shaft 3 at successive intervals for rotation therewith and a corresponding number of sets of stationary vanes 10 are attached to the housing which serve to agitate, mix and homogenize fluid as it is impelled by the moving vanes 9 through the housing to the spray head. There may be any suitable number of moving and fixed sets of vanes, depending on the type of the fluid material and its tendency to separate. The fixed vanes in particular serve to maintain a homogeneous mixture, especially in the event some drying gas or steam is admixed with the fluid material to facilitate a finer dispersion of the material through the spray head. Three sets of moving vanes 9 and three sets of fixed vanes 10 are depicted in Fig. 1, each set preferably consisting of four vanes spaced at equal circumferential distances around the shaft or housing as the case may be. The vanes 9 are preferably each of a contour providing a high thrust toward the spray head, with minimum drag in rotation which, in the case of Fig. 1, is advantageously clockwise as viewed in top plan.

The lower end of the rotor shaft 3 extends into a well 11 formed in the base of the hollow spray head 2, the well 11 providing a vertical journal bearing lubricated by the fluid supplied to the spray head although it may be independently lubricated from a bore in the shaft (not shown). In accordance with this invention, the well 11 is of a depth sufficient to permit of substantial axial movement of the shaft 3 in either direction from the intermediate position shown in Fig. 1. The shaft 3 carries a positionally adjustable slotted valving rotor 12 adjacent its lower end, the rotor preferably being removably secured to the shaft as by means of a key 13 and set screw (not shown) and being adapted by its rotation to effect a continuous valving action on a number of Venturi-type dispersion nozzles 14 arranged in superposed sets in the stationary spray head 3. Three such sets are depicted in the spray head of the device as shown in Fig. 1 and the axial adjustability of the rotor 12 enables selective valving of the sets to be effected, as will more fully appear hereinafter.

Means are provided for axially adjusting the shaft 3 so as to position the valving rotor 12 in desired operative relation to the sets of Venturi-type nozzles 14. As here preferably embodied, the prime mover 4 which may be a steam or air turbine, but is preferably a variable speed electric motor, is removably coupled to the shaft 3 for direct drive as by means of the mechanical coupling 15, and is vertically adjustably mounted on a standard 16 as by means of a wheel and spindle unit 17 threadedly engaging a suitable arm 18 on the prime mover. The standard 16 is bolted or otherwise suitably affixed to the bolting flange 6. It will be obvious that pneumatic or hydraulic means may be employed for vertically adjusting the prime mover in lieu of the mechanical means shown. Rotation of the wheel-spindle unit 17 will effect axial movement of the prime mover 4 and hence of the valving rotor 12.

The spray head 2 is constructed and arranged to provide a cylindrical rotor chamber 19 to which the fluid material is supplied in a homogeneous state and under pressure of the movable vanes 9, from the housing 1. Advantageously, the housing 1 may be provided with an annular securing flange 20 through which bolts or other suitable means of fixation (not shown) may be passed into securing engagement with the spray head to effect a fluid-tight seal between the parts. In accordance with this invention also, the bore of the housing is preferably suitably flared at its terminus with the spray head to effect a smooth flow of the fluid material to the top of the rotor chamber 19. To this end, the housing may be provided with a tapered portion 21.

The valving rotor 12 is of cylindrical contour as noted and is apertured from top to bottom to provide a suitable number of passages 22 through which the fluid material supplied to the chamber 19 at the top of the rotor is adapted to pass to the bottom of the chamber. In this manner, the fluid in the chamber 19 offers negligible impedance to axial adjustment of the rotor in the chamber. The passages 22 are preferably arranged in a circular row concentric with the rotor and in uniformly circumferentially spaced relation to each other paralleling the rotational axis of the rotor. The circumferential periphery of the rotor 12 is suitably radially pierced to provide communication with the passages 22 to the end that fluid material entering the passages 22 may be discharged under pressure from the rotor through one or more of the sets of Venturi-type nozzles 14. As here preferably embodied, the rotor 12 is provided with an annular chamber 23 concentric with the rotor and disposed midway between the top and bottom of the rotor. The chamber 23 is preferably of a width radially, equal or substantially equal to the diameter of the respective passages 22 with which passages it is in matching vertical alignment so as to be supplied with fluid material therefrom. The chamber 23 is connected at intervals with the circumferential periphery of the rotor by a suitable number of radially extending sector shaped slots 24 which are likewise disposed midway between the top and bottom of the rotor in equally circumferentially spaced relation to each other.

The rotor and its slots are vertically dimensioned circumferentially so as to be positionable vertically with the slots spanning vertically at least one of said vertically superposed sets of nozzles 14 as a minimum and with the other sets of nozzles covered by the rotor circumferential periphery. Preferably, however, and as here embodied, the rotor and its slots are vertically dimensioned so as to be positionable vertically with the slots spanning vertically a pair of adjacent sets of nozzles at least in part and with the remaining set covered by the rotor circumferential periphery. The slot width, or angular dimension, at the rotor circumference is of a magnitude sufficient to span at least one, and preferably two nozzle openings in the same set at the same time as in accordance with the illustrative embodiment of this invention. Thus, a high frequency discontinuous, interrupted, or intermittent flow of fluid material through the nozzles 14 is obtainable in order to aid the dispersion effect of the nozzles, and prevent clogging. Adjustment of the spray distance or radius is obtainable by varying the rotor speed and the selection of a discharge path as to direction and width is controllable at will.

The superposed sets of Venturi nozzles 14 consist each of a suitable number of the nozzles 14 more or less tangentially arranged with respect to the rotor 12, each nozzle flaring outwardly from a circular inlet to a generally elliptical outlet. By this arrangement, a more efficient dispersion or atomizing effect is obtained, and the fluid material discharging from the nozzles is given an initial rotary motion about the spray head, as viewed in Fig. 2 which promotes more efficient admixture and contact of the dispersed fluid material with a drying medium as in the tower 6a particularly when the drying medium is itself given a counter rotational movement on entry into the tower.

Figure 3:
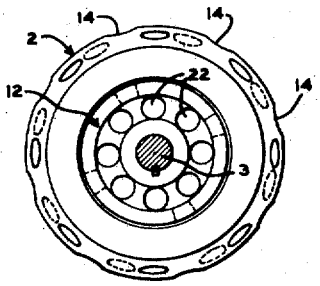
Fig. 3 is a view taken generally along the line 3—3 of Fig. 1 showing the arrangement of the dispersion nozzles of the spray device.
Figure 2:
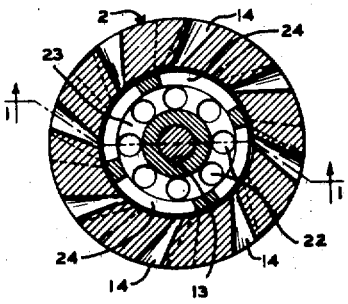
Fig. 2 is a view in section of the spray head of the device of Fig. 1, taken along the line 2—2 of Fig. 1.

The sets of nozzles 14 are also preferably disposed and arranged in the spray head 12 in staggered relation to each other in azimuth as is indicated in Figs. 2 and 3. It will be evident that, with three sets of nozzles 14 as here preferably employed, the arrangement is such that the discharge of fluid from the nozzles may be effected through a substantial vertical angle either horizontally as through the middle set, or downwardly through the bottom set, or upwardly through the top set or partly through the upper and middle or lower and middle sets. Various other suitable arrangements will be apparent to those skilled in the art. The vertical spacing of the sets of nozzles 14 is preferably such that the rotor portions above and below the slots 24 can cover the openings of two of the sets while the third is uncovered or can cover the upper or lower set completely while the rotor slots 24 are in communication with both remaining sets, either the middle and lower or the middle and upper.

It will be evident that, in the operation of the spray device in accordance with this invention, the pressure imparted to the fluid material may be varied by merely varying the prime mover speed and without varying the external pressure. Thus, an increasing pressure commensurate with an increasing frequency of discharge interruption while maintaining a substantially constant rate of discharge, is obtainable through the provision of the moving vanes 9 acting as pumping elements in accordance with this invention.

The invention in its broader aspects is not limited to the specific mechanisms shown and described but departures may be made therefrom within the scope of the accompanying claims without departing from the principles of the invention and without sacrificing its chief advantage.

What is claimed is:

1. A spray device comprising a spray head having a valving rotor chamber to be supplied with fluid material under pressure and having separate sets of dispersion nozzles through which said fluid is adapted to be discharged from said chamber; means for supplying fluid material under pressure to said chamber; a valving rotor adjustable axially of its rotational axis with respect to said sets of nozzles, said rotor being internally channelled and apertured to provide at least one continuous passageway for leading said fluid material from said chamber into said nozzles, each said passageway terminating at the circumferential periphery of said rotor in a discharge opening movable into and out of register with successive nozzles, whereby on rotation of said rotor said discharge opening may be moved progressively into and then out of register with successive nozzles, the flow of said fluid material through each of said successive nozzles being intermittently interrupted by said movement of said opening into and out of register with said nozzles; and, means for selectively positioning said valving rotor relative to said sets for admitting fluid material to one or more of said sets, at will.

2. The device of claim 1 in which said sets are superposed.

3. The device of claim 2 in which said superposed sets are angularly offset in azimuth.

4. The device of claim 1 in which said nozzles have each a substantially circular inlet port and an ovoid outlet port and an interport periphery flaring outwardly from said inlet, to said outlet port.

5. The device of claim 1 in which said sets comprise an upper, a middle and a lower set, the nozzles of the upper and lower sets extending angularly upwardly and downwardly, respectively, from the middle set which latter has its nozzles disposed substantially horizontally.

6. A spray device comprising means forming a pumping chamber adapted to be supplied with fluid material to be sprayed; pumping means in said chamber for imparting pressure to said fluid material in said chamber; a spray head having a valving rotor chamber adapted to be supplied with fluid material under pressure from said pumping chamber and having separate sets of dispersion nozzles through which said fluid is adapted to be discharged from said valving rotor chamber; a valving rotor adjustable axially of its rotational axis with respect to said sets of nozzles, said rotor being internally channelled and apertured to provide at least one continuous passageway for leading said fluid material from said chamber into said nozzles, each said passageway terminating at the circumferential periphery of said rotor in a discharge opening movable into and out of register with successive nozzles, whereby on rotation of said rotor said discharge opening may be moved progressively into and then out of register with successive nozzles, the flow of said fluid material through each of said successive nozzles being intermittently interrupted by said movement of said opening into and out of register with said nozzles; and, means for selectively positioning said valving rotor relative to said sets for admitting fluid material to one or more of said sets, at will.

7. A spray device comprising a shaft housing adapted to be supplied with fluid material to be sprayed; a spray head having a valving rotor chamber adapted to be supplied with fluid material under pressure from said housing and having separate sets of dispersion nozzles through which said fluid is adapted to be discharged from said chamber; a valving rotor adjustable axially of its rotational axis with respect to said sets of nozzles, said rotor being internally channelled and apertured to provide at least one continuous passageway for leading said fluid material from said chamber into said nozzles, each said passageway terminating at the circumferential periphery of said rotor in a discharge opening movable into and out of register with successive nozzles, whereby on rotation of said rotor said discharge opening may be moved progressively into and then out of register with successive nozzles, the flow of said fluid material through each of said successive nozzles being intermittently interrupted by said movement of said opening into and out of register with said nozzles; means, including a rotor shaft in said housing, for driving said rotor; separate sets of vanes on said shaft and on said housing, respectively, for agitating, mixing, and homogenizing said fluid as it is impelled through said housing to said valving rotor chamber; and, means for axially moving said rotor shaft to selectively position said valving rotor relative to said sets of dispersion nozzles so as to admit fluid material to one or more of said sets of dispersion nozzles, at will.

8. A spray device comprising a spray head having a central compartment of cylindrical contour from which nozzles lead tangentially to the exterior of the spray head, said compartment being open at its top and having a bearing well at its bottom concentric therewith, and said nozzles being arranged in separate superposed sets spaced from each other; a housing extending from said spray head and forming a passage leading to said compartment, said housing having a nozzle at its other end through which fluid material is adapted to be supplied to said rotor; a rotor shaft concentric with said housing journalled at its one end in said well for rotation and axial translation therein and journalled adjacent its other end in said housing a cylindrical rotor in said compartment secured to said shaft and in close running relation to the wall of said compartment, said rotor having outlets in the circumferential periphery thereof and having an internal cavity providing passages for the flow of fluid material therethrough from top to bottom and to said outlets; a prime mover for driving said shaft, coaxially connected thereto at its said other end; and, extensible means connecting said prime mover and said housing for axially translating said prime mover and shaft to selectively position said rotor in said compartment for discharging fluid material from its said openings through one or more of said sets of nozzles.

9. The device of claim 8 in which said sets of nozzles are angularly disposed.

10. The device of claim 8 in which said passages in said rotor are arranged in a circular row concentric with said rotor.

11. The device of claim 8 in which said cavity includes an annular compartment and in which said openings are sector shaped slots leading therefrom.

12. The device of claim 8 in which said housing has a flared bore at its junction with said spray head.

13. The device of claim 8 in which said housing has an annular mounted flange at one end and an inlet nozzle integral with said flange.

HERMANN C. SCHUTT.

References Cited in the file of this patent or the original patent

UNITED STATES PATENTS

| Number | Name | Date |
|---|---|---|
| 1,140,462 | Johnson | May 25, 1915 |
| 2,099,988 | Norris | Nov. 23, 1937 |
| 2,282,622 | Torrence | May 12, 1942 |